United States Patent
Iyoda et al.

(10) Patent No.: US 8,098,435 B2
(45) Date of Patent: Jan. 17, 2012

(54) OPTICAL COMBINER AND IMAGE PROJECTOR USING THE OPTICAL COMBINER

(75) Inventors: Yoshitomo Iyoda, Yokohama (JP); Akira Inoue, Yokohama (JP); Tomomi Sano, Yokohama (JP); Michiko Takushima, Yokohama (JP); Takayuki Shimazu, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 98 days.

(21) Appl. No.: 12/756,008

(22) Filed: Apr. 7, 2010

(65) Prior Publication Data
US 2010/0259729 A1     Oct. 14, 2010

(30) Foreign Application Priority Data

Apr. 10, 2009   (JP) ................. 2009-095711

(51) Int. Cl.
*G02B 27/10* (2006.01)
*G02B 27/42* (2006.01)
*G02B 3/08* (2006.01)
(52) U.S. Cl. ........ 359/618; 359/558; 359/566; 359/741; 359/742; 359/619
(58) Field of Classification Search .......... 359/741–743, 359/618, 619, 626, 558, 566, 567, 719; 353/31, 353/33, 37
See application file for complete search history.

(56) References Cited

U.S. PATENT DOCUMENTS

| | | | |
|---|---|---|---|
| 4,870,268 A | | 9/1989 | Vincent et al. |
| 4,930,864 A | * | 6/1990 | Kuster et al. .................. 359/350 |
| 5,459,611 A | | 10/1995 | Bohn et al. |
| 5,751,492 A | * | 5/1998 | Meyers ......................... 359/619 |
| 5,801,889 A | * | 9/1998 | Meyers et al. ................ 359/743 |
| 6,496,465 B1 | | 12/2002 | Broome et al. |
| 7,397,616 B2 | * | 7/2008 | Nagai et al. ................... 359/741 |
| 2007/0098324 A1 | | 5/2007 | Kitamura et al. |
| 2008/0174739 A1 | | 7/2008 | Iwasaki |
| 2008/0212036 A1 | | 9/2008 | Hishida |
| 2008/0225361 A1 | | 9/2008 | Kasazumi et al. |

FOREIGN PATENT DOCUMENTS

| | | |
|---|---|---|
| JP | 2004334082 A | 11/2004 |
| JP | 2006267457 A | 10/2006 |
| JP | 2007121899 A | 5/2007 |
| JP | 2008033042 A | 2/2008 |
| JP | 2008216456 A | 9/2008 |
| WO | WO-2005073798 A1 | 8/2005 |

OTHER PUBLICATIONS

Yoshitomo Iyoda et al., U.S. Appl. No. 12/755,986, "Optical Combiner and Image Projector Using the Optical Combiner", filed Apr. 7, 2010.

* cited by examiner

*Primary Examiner* — Loha Ben
(74) *Attorney, Agent, or Firm* — Venable LLP; Michael A. Sartori; Christopher Ma

(57) ABSTRACT

An optical combiner in which the number of parts used is lessened is made of a resin. The optical component comprises a first surface, a diffraction grating, and a second surface. The first surface is a surface providing first, second, and third lenses. The diffraction grating diffracts to a common optical path leading to the second surface light of the first wavelength incident on the first lens, light of the second wavelength incident on the second lens, and light of the third wavelength incident on the third lens. The second surface emits light incident thereon through the common optical path. The optical path from the first surface to the diffraction grating and the common optical path are constituted of the resin.

4 Claims, 2 Drawing Sheets

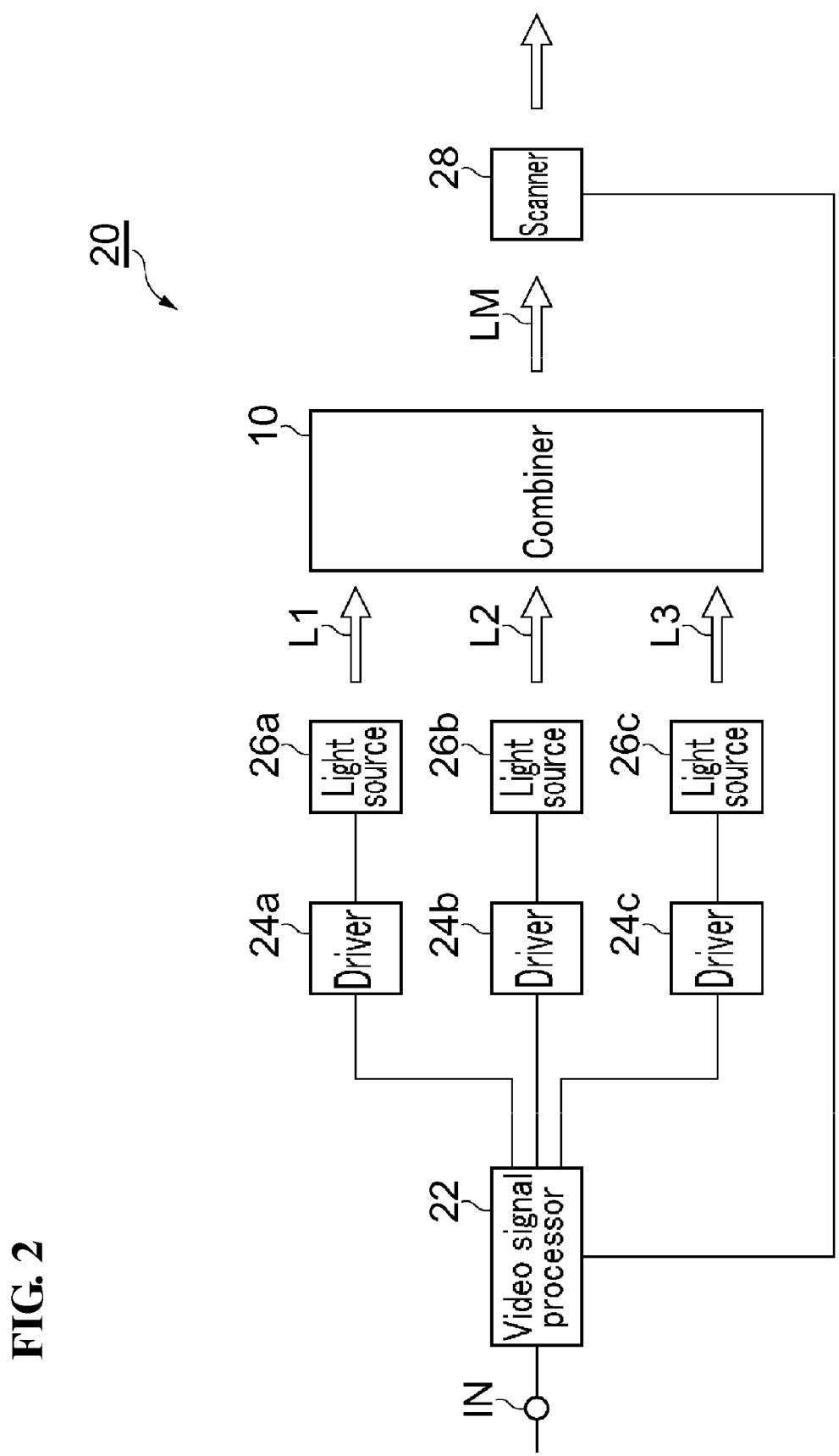

OPTICAL COMBINER AND IMAGE PROJECTOR USING THE OPTICAL COMBINER

BACKGROUND OF THE INVENTION

1. Field of the Invention

The present invention relates to an optical combiner, and to an image projector in which the optical combiner is used.

2. Description of Related Art

Image projectors are described in Japanese Patent Application Publication No. 2008-033042, Japanese Patent Application Publication No. 2004-334082, International Publication No. 2005/073798, Japanese Patent Application Publication No. 2007-121899, Japanese Patent Application Publication No. 2006-267457, and Japanese Patent Application Publication No. 2008-216456. In many cases, an image projector is equipped with three light sources for RGB, lenses, a combiner and a scanning mechanism. Light emitted from the three light sources are condensed by the lenses, the combiner combines RGB rays, and the scanning mechanism scan combined light, and thereby images are displayed. A dichroic minor, a prism, a diffraction grating device, etc. are used in the combiner. Consequently, it is difficult to downsize the image projector in which a number of parts are used.

SUMMARY OF THE INVENTION

The object of the present invention is to provide an optical combiner in which the number of parts is lessened, and also to provide an image projector in which the optical combiner is used.

To achieve the object, an optical combiner made of a resin is provided. The optical combiner comprises a first surface, a diffraction grating, and a second surface. The first surface is a surface providing first, second, and third lenses. Light of a first wavelength that is incident on the first lens, light of a second wavelength that is incident on the second lens, and light of a third wavelength that is incident on the third lens are diffracted by the diffraction grating to a common optical path leading to the second surface. The second surface emits the light that is incident thereon through the common optical path. The optical path from the first surface to the diffraction grating and the common optical path are constituted of the resin.

This optical combiner can be formed by integrally molding the resin. The first, second, and third lens may be Fresnel lenses.

Another embodiment of the present invention is an image projector comprising an optical combiner of the present invention, first, second, and third light sources, and a scanning mechanism. The first light source emits light having a first wavelength, the second light source emits light having a second wavelength, and the third light source emits light having a third wavelength. The light beams from the first, second, and third light sources are combined on the common optical path by the optical combiner, from which the combined light is emitted. The scanning mechanism scans the light combined by the optical combiner.

With a structure according to the present invention, it is possible to provide an optical combiner in which the number of parts can be reduced. Also, since the optical paths to the second surface from the first, second, and third lenses are composed of a resin, the optical combiner is strong against an exterior disturbance. The image projector of the present embodiment is equipped with the above-mentioned optical combiner, in which the number of parts is lessened, and accordingly it can be downsized.

BRIEF DESCRIPTION OF THE DRAWINGS

FIG. 2 is a conceptional schematic diagram showing an image projector relating to an embodiment of the present invention.

DESCRIPTION OF THE PREFERRED EMBODIMENTS

Figure 1:
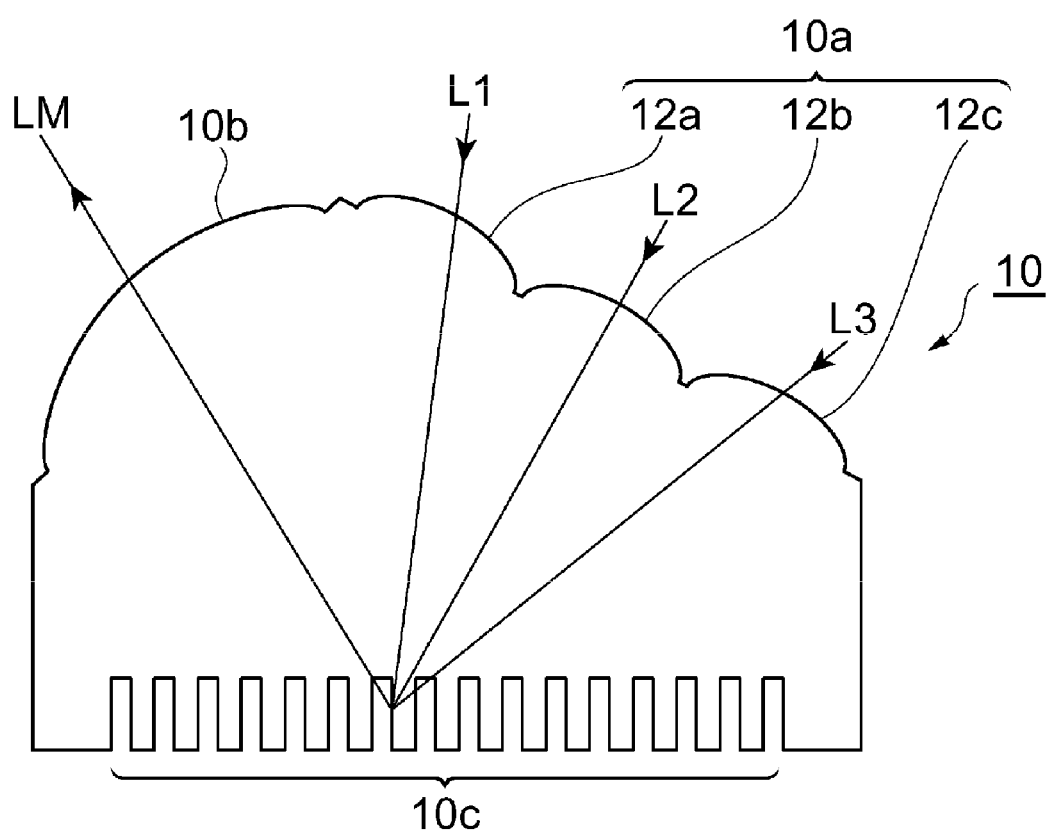
FIG. 1 is a conceptional schematic diagram showing an optical combiner relating to an embodiment of the present invention.

Hereinafter, preferred embodiments for carrying out the invention and advantages of the invention will be described in reference to the accompanying drawings. In the drawings, an identical mark represents the same element, and the repetition of its explanation is omitted.

FIG. 1, which is a conceptional schematic diagram of an optical combiner 10 relating to an embodiment of the present invention, shows its section including optical axes of light L1 having a first wavelength, light L2 having a second wavelength, light L3 having a third wavelength, and combined light LM (e.g., light L1 of first wavelength (R), light L2 of second wavelength (G), and light L3 of third wavelength (B) are light corresponding to three colors of RGB). The optical combiner 10 is a component made of resin. The combiner 10 comprises a first surface 10a, a second surface 10b, and a diffraction grating 10c.

The first surface 10a is a surface on which light L1 of first wavelength, light L2 of second wavelength, and light L3 of third wavelength are incident. The first surface 10a provides a first lens 12a, a second lens 12b, and a third lens 12c. The first lens 12a is a lens for condensing light L1 of first wavelength. The second lens 12b is a lens for condensing light L2 of second wavelength. The third lens 12c is a lens for condensing light L3 of third wavelength.

The second surface 10b is a surface from which the light LM combined by the optical combiner 10 is emitted. The second surface 10b may be planar, or may be a surface forming lenses as shown in FIG. 1.

The diffraction grating 10c diffracts light L1 of first wavelength, which has been condensed by the first lens, onto the common optical path of the combined light LM. Also, the diffraction grating 10c diffracts light L2 of second wavelength, which has been condensed by the second lens, onto the common optical path of the combined light LM. Furthermore, the diffraction grating 10c diffracts light L3 of third wavelength, which has been condensed by the third lens, onto the common optical path of the combined light LM. The diffraction grating 10c is constituted of a first medium (resin) and a second medium (e.g., air) which are alternately arranged. It is possible to determine the kind of medium that constitutes the diffraction grating 10c, the size of each grating, etc. according to the wavelength of light to be diffracted.

The combiner 10 can be made by integral molding of cyclic olefin polymer or polycarbonate, for example.

FIG. 2 is a conceptional schematic diagram showing an image projector 20 relating to an embodiment of the present invention. The image projector 20 comprises a video signal processing unit 22, drivers 24a to 24c, light sources 26a to 26c, an optical combiner 10, and a scanning mechanism (scanner) 28.

The video signal processing unit 22 receives video signals input into the input terminal IN, and forms the respective RGB signals. The video signal input into the video signal processing unit 22 is a composite video signal, for example. The video signal processing unit 22 is connected to drivers 24a to 24c, electrical signals are output to them according to the strength of the respective RGB signals thus formed.

The driver 24a is a circuit for modulating the light source 26a so as to emit light for the first wavelength (R). The driver 24b is a circuit for modulating a light source 26b so as to emit light for the second wavelength (G). The driver 24c is a circuit for modulating the light source 26c so as to emit light for the third wavelength (B). The drivers 24a to 24c are connected with the light sources 26a to 26c, and output modulation signals to the light sources 26a to 26c, respectively.

The light sources 26a to 26c are a laser diode, for example. The light source 26a emits light having a first wavelength at strength according to the modulation signal from the driver 24a. The light source 26b emits light having a second wavelength at a strength according to the modulation signal from the driver 24b. The light source 26c emits light having a third wavelength at a strength according to the modulation signal from the driver 24c.

The light sources 26a to 26c are optically connected to the optical combiner 10. Light beams from the light sources 26a to 26c are combined by the combiner 10, and are emitted as combined light LM from the combiner 10. The combiner 10 is optically connected to the scanner 28.

The scanner 28 scans light emitted from the combiner 10 and displays images on the projection surface. The scanner 28 can be constituted of a galvanic mirror for horizontal scanning and a galvanic mirror for vertical scanning, for example.

Hereinafter, the function and effect of the combiner 10 and the image projector 20 will be explained. The combiner 10 is a component made of resin, in which the diffraction grating 10c, the first lens 12a, second lens 12b, and the third lens 12c are integrally formed. Thus, the combiner 10 can provide a plurality of optical elements with a single component, allowing reduction in the number of parts. Also, in the combiner 10, it is unnecessary to make positional adjustment of optical elements, such as the diffraction grating 10c, the first lens 12a, the second lens 12b, and the third lens 12c. Moreover, the combiner 10 is strong against an exterior disturbance, since the optical path through which light of each wavelength passes and the optical path through which the combined light passes are constituted of a resin. The image projector 20 in which such a combiner 10 as described above is used can be downsized and is strong against an exterior disturbance.

In the above, the invention is described based on practical and preferable embodiments; however, the invention should not be limited to the embodiments, and various modifications are possible within the scope of the invention. For example, the first to third lenses may be Fresnel lenses. In such case, the thickness of the first to third lenses can be made thinner. Also, the first to third lenses may be gradient index lenses. The image projector of the present invention is not limited to one in which the light source is modulated. For example, light that is emitted from a light source at constant strength may be modulated by a modulator according to video signals of RGB.

What is claimed is:

1. An optical combiner made of resin comprising:
    a first surface providing a first lens for light of a first wavelength, a second lens for light of a second wavelength, and a third lens for light of a third wavelength;
    a second surface emitting combined light; and
    a diffraction grating for diffracting to a common optical path leading to the second surface light of the first wavelength incident on the first lens, light of the second wavelength incident on the second lens, and light of the third wavelength incident on the third lens, an optical path from the first surface to the diffraction grating and the common optical path being constituted of the resin.

2. An optical combiner according to claim 1, wherein the optical combiner is formed by integral molding of the resin.

3. An optical combiner according to claim 1, wherein the first to third lenses are Fresnel lenses.

4. An image projector comprising:
    a first light source for emitting light having the first wavelength;
    a second light source for emitting light having the second wavelength;
    a third light source for emitting light having the third wavelength;
    an optical combiner according to claim 1, the combiner for combining light from the first light source, light from the second light source, and light from the third light source on the optical path so as to emit the combined light; and
    a scanning mechanism for scanning light combined by the optical combiner.

* * * * *